United States Patent [19]
Yoshizawa et al.

[11] 3,904,479
[45] Sept. 9, 1975

[54] PROCESS FOR PREPARING PANCREATIC ELASTASE

[75] Inventors: Masayuki Yoshizawa, Kawagoe; Kengo Araki, Niiza; Atsushi Koide, Funabashi; Yoshitaka Matsuoka, Tokyo, all of Japan

[73] Assignee: Eisai Co., Ltd., Tokyo, Japan

[22] Filed: Oct. 9, 1973

[21] Appl. No.: 404,719

[30] Foreign Application Priority Data
Oct. 9, 1972 Japan.............................. 47-100656

[52] U.S. Cl................................ 195/66 R; 195/66
[51] Int. Cl.²........................................ C07G 7/026
[58] Field of Search............................ 195/66 R, 4

[56] References Cited
UNITED STATES PATENTS
3,367,836  2/1968  Thuillier........................... 195/66 R
3,691,015  9/1972  Leidholdt.......................... 195/66 R

*Primary Examiner*—Lionel M. Shapiro
*Attorney, Agent, or Firm*—Woodhams, Blanchard and Flynn

[57] ABSTRACT

A process for preparing pancreatic elastase characterized by the steps of salting out a liquid extract of mammalian pancreas, dissolving the resulting precipitates in an aqueous solution having a pH of 5–10, incubating the solution at 5°–50°C for at least 1 hour, and again salting out the solution.

6 Claims, No Drawings

PROCESS FOR PREPARING PANCREATIC ELASTASE

BACKGROUND OF THE INVENTION

1. Field of the Invention

The present invention relates to an improved process for preparing pancreatic elastase, and particularly a process which comprises the steps of salting out a liquid extract of pancreas to collect a precipitated fraction containing elastase, dissolving the collected fraction in an aqueous solution having a pH of 5–10, incubating the solution at 5°–50°C for at least one hour and again salting out the solution, thereby obtaining elastase-rich precipitates. When this process is followed by a crystallization step, high-purity elastase crystals are produced in a large amount with a high yield.

2. Description of the Prior Art

Several processes for preparing elastase have been proposed in the art. A typical process among them is the one reported by U. J. Lewis et al. in *The Journ. of Biol. Chem. Vol.* 222, p. 705 (1956). Their process comprises the steps of extracting pancreatin with a 0.1 M acetate buffer solution having a pH of 4.5, collecting a fraction precipitated by a 45% saturated ammonium sulfate solution, dissolving it in a 0.1 M carbonate buffer solution having a pH of 8.8, dialyzing the solution against running water to collect the precipitated euglobulin, suspending the euglobulin precipitate in water, adding solid ammonium sulfate until 35% saturation to the aqueous suspension of said euglobulin to collect the resulting precipitates, dissolving the collected precipitates in a carbonate buffer solution having a pH of 8.8, and adding crystal seeds to the solution to precipitate elastase crystals.

The above process, however, requires a dialysis step for separately collecting euglobulin as one of its essential operations. It is well known that a dialysis operation requires a special apparatus and is not suitable for a production in a large commercial scale, though it is applicable to the production in a laboratory scale. Their process, therefore, is not suited to the industrial production of elastase.

All the known processes other than the above Lewis' process are laboratory methods including a dialytic operation and, therefore, they will be impracticable as an industrial process for preparing elastase.

On the other hand, if elastase was directly crystallized without a dialysis step in those known processes, the crystallization of elastase would be difficult due to the existence of impurities, thus reducing the product yield and also the purity of elastase would be badly degraded.

SUMMARY OF THE INVENTION

The present invention provides an advantageous industrial process for preparing elastase without employing any dialytic operation. The process of the present invention comprises the steps of dissolving a salted-out precipitate containing elastase in an aqueous solution having a pH of 5–10, incubating the obtained solution by leaving it to stand still at 5°–50°C for at least 1 hour, whereby the included protein impurities which act to prevent the crystallization of elastase is degraded to substances of lower molecular weights by the coexisting protease so as to facilitate the crystallization of elastase.

In the present invention, as the pancreas of all mammals contain elastase, they are employable as the starting material for the process, but pancreas of a hog is most preferable in view of its high content of elastase. All the mammalian pancreas which are commercially available in the form of raw pancreas, pancreatin and dried pancreas may be used as the starting material for the process of the present invention. For the extraction of elastase from these starting pancreas, an aqueous solvent such as, for example, a weakly acidic or weakly alkaline water, or an aqueous salt solution or buffer solution should be used. This extraction step can be carried out by a conventional method as used in the above Lewis et al process. In the subsequent operations of two successive salting-out steps, inorganic salts conventionally used for the salting-out operation, such as, for example, ammonium sulfate, sodium sulfate and sodium chloride, can be used.

In the case of employing ammonium sulfate in the salting-out operation, elastase will be able to be obtained most effectively when the first salting-out is effected with 45% salt saturation and the second salting-out with 35% salt saturation. The range of pH value of 5–10 of the aqueous solution during the incubation of the solution at 5°–50°C for reducing the molecular weights of included protein impurities has been so selected that elastase may be stablized and protease may accomplish its digestion activity most strongly within such pH range.

The inclusions or protein impurities are decomposed by the coexisting protease and the decomposition velocity will be increased as the temperature of the solution is increased. Also, if the period of the incubation is too long, not only the included proteins but also elastase will be decomposed. Accordingly, the period of the incubation should be determined suitably according to the temperature of the incubation.

The optimum period for the incubation depends on the pH of the aqueous solution and the kinds of the starting material etc., but it is usually within the ranges of about 15–100 hours at 5°–15°C, about 5–30 hours at 15°–30°C and about 1–10 hours at 30°–40°C. The term "optimum incubation period" means the incubation period which will make the yields of elastase crystals to be precipitated in the subsequent crystallization step maximum.

The temperature of the incubation should not exceed 50°C, because, when the incubation is conducted at a temperature over 50°C, the optimum incubation period at at such temperature will become shorter, but, in case the incubation is carried out for a period longer than the optimum incubation period, the precipitated amount of elastate tends to be decreased rather abruptly.

Therefore, at a temperature over 50°C, a proper time control of the incubation period is difficult in the practice of the present process.

On the other hand, the incubation at a temperature lower than 5°C requires a very long time to obtain maximum yields of elastase crystals in the subsequent crystalization step and, therefore, such a low temperature is also undesirable in the practice of the present process.

All the process steps of the present invention should preferably be done at a temperature lower than 4°C, except for the above incubation step to be conducted at a temperature within the above-mentioned range.

The process of the present invention is advantageous in that any dialysis step is not required, but a direct crystallization of elastase is made possible, thus simplifying the operation of the process very much, and also in that, by this crystallization step, elastase can be obtained at a high yield superior to those of conventional processes using a dialysis step, such as the Lewis' process.

For example, the yield of elastase by the process of Lewis et al is 500 mg of elastase per 100 g of pancreatin, while, according to the process of the present invention, the yield of elastase is increased to about 600 mg per 100 g of pancreatin.

The elastase crystals obtained by the process of the present invention have been proved to be composed of two components, which are similar to those obtained by the conventional processes, by means of an electrophoresis with cellulose acetate strip (pH 10.0; glycinate buffer solution; $\mu$=0.1) and, thus, they are those which are usually called "crystalline elastase complex".

The activity of the crystalline elastase complex obtained in the process of the present invention for decomposing elastin is represented by elastase units.

The term "elastase unit" (El. U) is defined as follows. To 4 ml of substrate solution containing 24 mg (on a dry basis) of elastin substrate is added 1 ml of a solution containing a selected quantity of the elastase being tested, the pH is adjusted to 8.8 and the mixture is incubated at $37° \pm 0.1°C$ for 30 minutes. After the incubation the reaction is stopped by addition of 5 ml of 0.6 M acetate buffer solution (pH 5.3) containing 0.05% sodium lauryl sulfate. Then the mixture is centrifuged and E 275 m$\mu$ absorbance of the supernatant solution is estimated. The amount of tyrosine ($\mu$g) is calculated from the absorbance on the assumption that the absorbance is due to tyrosine. The elastase activity that releases 1 $\mu$g of tyrosine from elastin substrate per minute is defined as one elastase unit (El. U).

The process of the present invention will be illustrated below by way of Examples, which by no means limit the scope of the invention.

EXAMPLE 1

50 kg of hog pancreatin was added to 500 l of 0.1 M acetate buffer solution (pH 4.5) previously cooled to 4°C and the mixture was stirred for 4 hours and allowed to stand overnight. The mixture was filtered. To the filtration residue was added a further quantity of 100 l of the same buffer solution, and the mixture was stirred for 1 hour and then filtered again. The filtrates were combined and there was added thereto ammonium sulfate in an amount such that the salt concentration was made to be 45% of saturation. The wet precipitate (22 kg) separated thereby was redissolved in 132 l of 0.1 M phosphate buffer solution (pH 7.0), and allowed to stand in an incubator at 20°C for 20 hours. After filtration to remove turbid matter followed by cooling to 4°C and addition of ammonium sulfate in an amount to give a concentration of 35% of saturation, there was obtained 7 kg of a wet precipitate which was collected by filtration. This precipitate was dissolved in 42 l of 0.1 M carbonate buffer solution (pH 7.0), seeded with seed elastase crystals, and stirred at 5°C to precipitate elastase crystals.

Yield of elastase crystals : 300 g
Activity of elastase : 150 El.U/mg

EXAMPLE 2

1 kg of dried hog pancreas was added to 10 l of 0.1 M acetate buffer solution (pH 4.5) previously cooled to 4°C and the mixture was stirred for 4 hours and allowed to stand overnight. The mixture was filtered. To the filtration residue was added a further quantity of 2 l of the same buffer solution, and the mixture was stirred for 1 hour and then filtered again. The filtrates were combined and there was added thereto ammonium sulfate in an amount such that the salt concentration was made to be 45% of saturation. The wet precipitate (352 g) separated thereby was redissolved in 21 l of 0.1 M phosphate buffer solution (pH 7.0), and allowed to stand in an incubator at 15°C for 20 hours. After filtration to remove turbid matter followed by cooling to 4°C and addition of ammonium sulfate in an amount to give a concentration of 35% of saturation, there was obtained 53.5 g of a wet precipitate which was collected by filtration. This precipitate was dissolved in 0.32 l of 0.1 M carbonate buffer solution (pH 7.0), seeded with elastase seed crystals, and stirred at 5°C to precipitate elastase crystals.

Yield of elastase crystals : 4.95 g
Activity of elastase : 139 El.U/mg

EXAMPLE 3

2 kg of hog raw pancreas minced by a meat chopper was left alone for activation at 30°C for 8 hours, and was added to 6 l of 0.1 M acetate buffer solution (pH 4.5). The mixture was stirred for 4 hours and allowed to stand overnight. The mixture was filtered. To the filtration residue was added a further quantity of 1 l of the same buffer solution, and the mixture was stirred for 1 hour and then filtered again. The filtrates were combined and there was added thereto ammonium sulfate in an amount such that the salt concentration was made to be 45% of saturation. The wet precipitate (83 g) separated thereby was redissolved in 0.5 l of 0.1 M phosphate buffer solution (pH 7.0) and allowed to stand in an incubator at 20°C for 20 hours. After filtration to remove turbid matter followed by cooling to 4°C and addition of ammonium sulfate in an amount to give a concentration of 35% of saturation, there was obtained 21.9 g of a wet precipitate which was collected by filtration. This precipitate was dissolved in 130 ml of 0.1 M carbonate buffer solution (pH 7.0), seeded with elastase crystals, and stirred at 5°C to induce crystallization.

Yield of elastase crystals : 1.84 g
Activity of elastase : 150 El.U/mg

EXAMPLE 4

1 kg of hog pancreatin was added to 10 l of 0.1 M acetate buffer solution (pH 4.5) previously cooled to 4°C and the mixture was stirred for 4 hours and allowed to stand overnight. The mixture was filtered. To the filtration residue was added a further quantity of 2 l of the same buffer solution, and the mixture was stirred for 1 hour and then filtered again. The filtrates were combined and there was added thereto ammonium sulfate in an amount such that the salt concentration was made to be 45% of saturation. The wet precipitate (396 g) separated thereby was redissolved in 2.4 l of 0.1 M borate buffer solution (pH 7.0), and allowed to stand in an incubator at 22°C for 24 hours. After filtration to remove turbid matter followed by cooling to 4°C and addition of ammonium sulfate in an amount to give a concentration of 35% of saturation, and there was obtained 77.7 g of a wet precipitate which was collected by filtration. This precipitate was dissolved in 0.47 l of 0.1 M carbonate buffer solution (pH 7.0), seeded with elastase crystals, and stirred at 5°C to induce crystallization.

Yield of elastase crystals : 6.0 g
Activity of elastase : 144 El.U/mg

EXAMPLE 5

2 kg of hog raw pancreas minced by a meat chopper was left alone for activation at 30°C for 8 hours, and was added to 6 l of 0.1 M acetate buffer solution (pH 4.5). The mixture was stirred for 4 hours and allowed to stand overnight. The mixture was filtered. To the filtration residue was added a further quantity of 1 l of the same buffer solution, and the mixture was stirred for 1 hour and then filtered again. The filtrates were combined and there was added thereto ammonium sulfate in an amount such that the salt concentration was made to be 45% of saturation. The wet precipitate (82.8 g) separated thereby was redissolved in 0.5 l of 0.1 M phosphate buffer solution (pH 7.0), and allowed to stand at 5°C for 96 hours. After filtration to remove turbid matter followed by cooling to 4°C and addition of ammonium sulfate in an amount to give a concentration of 35% of saturation, there was obtained 38 g of a wet precipitate which was collected by filtration. This precipitate was dissolved in 230 ml of 0.1 M carbonate buffer solution (pH 7.0), seeded with elastase crystals, and stirred at 5°C to induce crystallization.

Yield of elastase crystals : 1.8 g
Activity of elastase : 110 El.U/mg

EXAMPLE 6

10 kg of hog pancreatin was added to 120 l of 0.1 M acetate buffer solution (pH 4.5) previously cooled to 4°C and the mixture was stirred for 4 hours and allowed to stand overnight. The mixture was filtered. To the filtrate was added ammonium sulfate in an amount such that the salt concentration was made to be 45% of saturation. The wet precipitate (4 kg) separated thereby was redissolved in 24 l of 0.1 M phosphate buffer solution (pH 7.0), and each 250 ml aliquot of the solution was allowed to stand in a thermostat at the temperatures and for the periods as shown in the following table. After filtration to remove turbid matter followed by cooling to 4°C and addition of ammonium sulfate in an amount to give a concentration of 35% of saturation, the resulted wet precipitate collected by filtration was dissolved in 0.1 M carbonate buffer solution (pH 7.0) of a volume 6 times as much as the precipitate, respectively, seeded with elastase crystals, and stirred at 5°C to induce crystallization. The obtained results are shown in the following table, which includes also a reference data of a comparative test in which no thermostat incubation was carried out.

| Incubation Period (hr) | Elastase Crystals (mg) | |
| --- | --- | --- |
| | 25°C | 30°C |
| 0 (control) | 60 | 60 |
| 10 | 90 | 660 |
| 15 | 270 | 480 |
| 20 | 720 | 510 |
| 25 | 570 | 330 |
| 30 | 540 | 150 |

EXAMPLE 7

10 kg of hog pancreatin was added to 120 l of 0.1 M acetate buffer solution (pH 4.5) previously cooled to 4°C and the mixture was stirred for 4 hours and allowed to stand overnight. The mixture was filtered. To the filtrate was added ammonium sulfate in an amount such that the salt concentration was 45% of saturation. The wet precipitate (4 kg) separated thereby was redissolved in 24 l of 0.1 M carbonate buffer solution (pH 7.5), and each 1 l aliquot of the solution was allowed to stand in an incubator at 20°C for the periods as shown in the following table. After filtration to remove turbid matter followed by cooling to 4°C and addition of ammonium sulfate in an amount to give a concentration of 35% of saturation, the resulting precipitate collected by filtration was dissolved in 0.1 M carbonate buffer solution (pH 7.0) of a volume 6 times as much as the precipitate, seeded with elastase, and stirred at 5°C to induce crystallization. The obtained results are shown in the following table, which includes also a reference data of a comparative test in which no thermostat incubation was carried out.

| Incubation Period (hr) | 0 (control) | 5 | 10 | 15 | 20 | 25 | 30 |
| --- | --- | --- | --- | --- | --- | --- | --- |
| Elastase Crystals (mg) | 20 | 70 | 950 | 1400 | 2160 | 660 | 590 |

EXAMPLE 8

5 kg of dried hog pancreas was added to 50 l of 0.1 M acetate buffer solution (pH 4.5) previously cooled to 4°C and the mixture was stirred for 4 hours and allowed to stand overnight. The mixture was filtered. To the filtrate was added ammonium sulfate in an amount such that the salt concentration was 45% of saturation. The wet precipitate (1.7 kg) separated thereby was redissolved in 10 l of 0.1 M carbonate buffer solution (pH 7.5), and each 1 l aliquot of the solution was allowed to stand in an incubator at 20°C for the periods as shown in the following table. After filtration to remove turbid matter followed by cooling to 4°C and addition of ammonium sulfate in an amount to give concentration of 35% of saturation, the resulting precipitate collected by filtration was dissolved in 0.1 M carbonate buffer solution (pH 7.0) of the volume 6 times as much as the precipitate, seeded with elastase, and stirred at 5°C to induce crystallization. The obtained results are shown in the following table, which includes also a reference data of a test in which no thermostat incubation was carried out.

| Incubation Period (hr) | 0 (control) | 5 | 10 | 15 | 20 | 25 | 30 |
| --- | --- | --- | --- | --- | --- | --- | --- |

| | | | | | | |
|---|---|---|---|---|---|---|
| Elastase Crystals(mg) | 0 | 1240 | 1450 | 1460 | 1470 | 1600 | 1240 |

EXAMPLE 9

10 kg of hog raw pancreas minced by a meat chopper was left alone for activation at 30°C for 8 hours, and was added to 90 l of 0.1 M acetate buffer solution (pH 4.5). The mixture was stirred for 4 hours, allowed to stand overnight and was filtered. To the filtrate was added ammonium sulfate in an amount such that the salt concentration was 45% of saturation. The wet precipitate (1.3 kg) separated thereby was redissolved in 7.8 l of 0.1 M carbonate buffer solution (pH 7.5), and each 1 l aliquot of the solution was allowed to stand in an incubator at 20°C for the periods as shown in the following table. After filtration to remove turbid matter followed by cooling to 4°C and addition of ammonium sulfate in an amount to give a concentration of 35% of saturation, the resulting precipitate collected by filtration was dissolved in 0.1 M carbonate buffer solution (pH 7.0) of the volume 6 times as much as the precipitate, seeded with elastase, and stirred at 5°C to induce crystallization. The obtained results are shown in the following table, which includes also a reference data of a comparative test in which no thermostat incubation was carried out.

to 30 hours at 15° to 30°C or about 1 to 10 hours at 30° to 40°C, and again salting out the solution.

2. A process according to claim 1, wherein the starting pancreas is hog pancreas.

3. A process according to claim 1, wherein the two salting-out steps are carried out by employing ammonium sulfate.

4. A process according to claim 3, wherein the first salting-out is effected with a salt concentration of 45% of saturation and the second salting-out is effected with a salt concentration of 35% of saturation.

5. A process according to claim 1, wherein the process steps except the incubation step are carried out at a temperature lower than 4°C.

6. A process according to claim 1, in which mammalian pancreas selected from the group consisting of raw pancrease, pancreatin and dried pancreas, is extracted with an aqueous solvent selected from the group consisting of weakly acidic water, weakly alkaline water, an aqueous salt solution and an aqueous buffer solution, to obtain an aqueous extract of mammalian pancreas; said aqueous extract is salted out with a salt selected from the group consisting of ammonium sulfate, sodium sulfate and sodium chloride to produce a pre-

| | | | | | | |
|---|---|---|---|---|---|---|
| Incubation Period (hr) | 0 (control) | 5 | 10 | 15 | 20 | 25 | 30 |
| Elastase Crystals (mg) | 0 | 1750 | 2080 | 2290 | 2390 | 2060 | 2260 |

The embodiments of the invention in which an exclusive property or privilege is claimed are defined as follows:

1. A process for preparing pancreatic elastase which comprises the steps of salting out a liquid extract of mammalian pancreas, dissolving the resulting precipitates in an aqueous solution having a pH of 5 to 10, incubating the solution for a period of incubation within a range of about 15 to 100 hours at 5° to 15°C, about 5 cipitate; the precipitate is dissolved in an aqueous solution having a pH of 5 to 10; the solution is incubated for said period of incubation; the incubated solution is salted out with said salt to produce a second precipitate; the second precipitate is dissolved in an aqueous solution and a crystalline elastase complex is recovered from the latter aqueous solution.

* * * * *